(12) United States Patent
Lapierre

(10) Patent No.: US 11,596,115 B2
(45) Date of Patent: Mar. 7, 2023

(54) PLANT CULTIVATION APPARATUS

(71) Applicant: Eurochampignon bvba, Ingelmunster (BE)

(72) Inventor: Stefaan Lapierre, Ingelmunster (BE)

(73) Assignee: Eurochampignon, Ingelmunster (BE)

( * ) Notice: Subject to any disclaimer, the term of this patent is extended or adjusted under 35 U.S.C. 154(b) by 102 days.

(21) Appl. No.: 16/294,243

(22) Filed: Mar. 6, 2019

(65) Prior Publication Data

US 2019/0200543 A1 Jul. 4, 2019

(30) Foreign Application Priority Data

| Mar. 6, 2018 | (EP) | .................................... | 18160306 |
| Jul. 25, 2018 | (EP) | .................................... | 18185546 |
| Oct. 16, 2018 | (EP) | .................................... | 18200784 |

(51) Int. Cl.
*A01G 18/70* (2018.01)
*A01G 18/62* (2018.01)

(52) U.S. Cl.
CPC ............. *A01G 18/70* (2018.02); *A01G 18/62* (2018.02)

(58) Field of Classification Search
CPC ........ A10G 18/22; A10G 18/60; A10G 18/62; A10G 18/70; A01G 31/042; B65G 65/23; B65G 65/24; B65G 65/30; B65G 65/34; B65G 65/48; B65G 65/4881
USPC ............................................................ 47/65
See application file for complete search history.

(56) References Cited

U.S. PATENT DOCUMENTS

| 805,801 | A | 11/1905 | Kline |
| 3,242,614 | A | 3/1966 | Thompson |
| 2016/0135384 | A1* | 5/2016 | Souder .................. A01G 31/06 47/65 |

(Continued)

FOREIGN PATENT DOCUMENTS

| CH | 220141 A | 3/1942 |
| CN | 103238477 A | 8/2013 |

(Continued)

OTHER PUBLICATIONS

Elena L., "Art History 201, Ancient Near Eastern Art: The Ur-Nammu Stele", Feb. 27, 2011, 3 pages; http://www.elenagarthist.blogspot.com/2011/03/ancient-near-eastern-art-ur-nammu-stele.html.

(Continued)

*Primary Examiner* — Brady W Frazier
*Assistant Examiner* — Madison Elizabeth Dittner
(74) *Attorney, Agent, or Firm* — MaxGo Law PLLC

(57) ABSTRACT

An apparatus for cultivating plants, including mushrooms, is provided that includes at least one tilt-able plant cultivation module coupled to at least one horizontal support unit by at least one hydraulic unit. The at least one horizontal support unit is coupled to a vertical support unit. The tilt-able plant cultivation module further includes a frame and a plant cultivation tray. The frame of the tilt-able plant cultivation module and the at least one horizontal support unit is coupled manually, hydraulically, or pneumatically. The tilt-able plant cultivation module tilts at a desirable angle which facilitates and makes the plant harvesting process more convenient for a worker without affecting the under cultivated plants. The worker is enabled to look closer to the tilt-able plant cultivation module that in turn allows the worker to select plants to be harvested.

11 Claims, 5 Drawing Sheets

(56) References Cited

U.S. PATENT DOCUMENTS

2018/0359973 A1* 12/2018 Millar .................... A01D 91/00

FOREIGN PATENT DOCUMENTS

| CN | 203985152 U | | 12/2014 | |
|---|---|---|---|---|
| CN | 206525189 U | | 9/2017 | |
| CN | 107593283 A | | 1/2018 | |
| CN | 107691121 A | | 2/2018 | |
| CN | 207040403 U | | 2/2018 | |
| CN | 207040404 U | | 2/2018 | |
| EP | 1568265 A2 | | 8/2005 | |
| GB | 189408352 A | | 3/1895 | |
| GB | 2135962 A | * | 9/1984 | ................ B66F 9/19 |
| GB | 2135963 A | * | 9/1984 | ............ B65G 65/23 |
| JP | 2012055234 A | | 3/2012 | |
| JP | 2012110285 A | | 6/2012 | |
| KR | 20090116682 A | | 11/2009 | |
| KR | 101378167 B1 | * | 3/2014 | |
| NL | 1027511 C2 | | 5/2006 | |
| WO | WO-2004075626 A1 | * | 9/2004 | ............ A01G 18/60 |
| WO | WO-2009018618 A1 | * | 2/2009 | ............ F24S 30/425 |

OTHER PUBLICATIONS

Helmhardt Von Hohberg, W., "Georgica curiosa", 1682, engraving Lib: 6.C.54., 1 page.

Engelbrecht, M., "Harte Müh und saure Garten Arbeit", second quarter of the 18th century, engraving, 1 page.

Colonial Williamsburg, "History of the Gardens", 3 pages, © 2019 The Colonial Williamsburg Foundation https://www.history.org/history/CWLand/histry1.cfm.

"A man being hit on the head by a falling flower-pot in Rome, Via del Nazzareno", ca. 1890, oil painting, 1 page.

Straatsma, G. et al., "Nieuwe methoden voor de handmatige oogst van champignons", Jan. 2007, English translation of Abstract provided, 38 pages, © 2007 Praktijkonderzoek Plant & Omgeving B.V.

Sermatec, "Lignes de cueille de champignons", Nov. 25, 2014, screenshot from YouTube film, 1 page, published by Sermatec; https://www.youtube.com/watch?v=aBJns1cXBUs&app=desktop.

Limbraco, B.V., "Limbraco Introduction movie 2013", Aug. 8, 2013, screenshot from YouTube film, 1 page, published by Limbraco, B.V.; https://www.youtube.com/watch?v=fcATgFCno0w.

Sermatec, "Lignes de cueille de champignons" (Part 1), May 15, 2019, screenshot from YouTube film, 1 page, published by Bram van Oeffelt; https://www.youtube.com/watch?v=g1iXqgi9jfs&feature=youtu.be.

Sermatec, "Lignes de cueille de champignons" (Part 2), May 15, 2019, screenshot from YouTube film, 1 page, published by Bram van Oeffelt; https://www.youtube.com/watch?v=fm2DraC-uV4&feature=youtu.be.

Zonnenberg Witlof, Photos of chicory plant at Zonnenberg Witlof, Graspeel 3, 5411 LB, Zeeland, Netherlands, 1 page.

Brilman, G.H. et al., "Hydrauliek", 2001, English translation of textbook Forward provided, 94 pages, © 1996 Ontwikkelcentrum.

Opinion pursuant to Article 84 of the Dutch Patent Act of 1995 on Dutch patent NL 2021399 dated Jul. 24, 2019; see pp. 3-4 for list of cited references.

Dutch Search Report dated Jan. 14, 2019 for Dutch Application No. NL 2021399 filed Jul. 26, 2018.

European Search Report dated Jan. 25, 2019 for European Application No. 18185546, filed Jul. 25, 2018.

* cited by examiner

PLANT CULTIVATION APPARATUS

RELATED APPLICATIONS

This application claims priority benefit of European Application No. 18160306.9 filed on Mar. 6, 2018; European Application No. 18185546.1 filed in Europe on Jul. 25, 2018; and European Application No. 18200784.9 filed on Oct. 16, 2018; the contents of which are hereby incorporated by reference.

FIELD OF THE INVENTION

The present invention concerns a process and an apparatus for cultivating plants and/or fungi, preferably mushrooms, wherein a tilt-able plant cultivation module is used. Preferably, the tilt-able plant cultivation module is hydraulically operated for enabling the worker to easily harvest the cultivated plants.

BACKGROUND OF THE INVENTION

Mushroom farming is a flourishing business worldwide which also provides employment to many workers. However, harvesting mushrooms is a cumbersome task for workers involved in traditional ways of cultivating mushrooms.

Conventionally, mushrooms are cultivated on horizontal cultivation beds or trays which are stacked on vertical racks in a moist room. Upon cultivation, mushrooms are gathered selectively by the workers who lean over the trays and cut selected mushrooms by hand and transport them into the boxes.

The handpicking process requires the worker to lean over the horizontal trays and pick only a few mushrooms at a time. This process is not only uneasy and stressful for the back of the workers, but also tends to rupture some of the plants which are not fully grown. Moreover, in a situation when the cultivation trays are located high on the vertical racks, the worker needs need to place ladders or use a pulley system to reach at the height of the cultivation trays and handpick the mushrooms. Therefore, this process is incommodious for the worker and is also time consuming.

Presently, there are several alternative solutions such as one disclosed in CN203985152. This prior art discloses a frame body, overturning trays and a driving device of the mushroom cultivation bed. The driving device, with a driving shaft, enable the rotation of the overturning trays so that the mushroom trays becomes available within the reach of the worker. However, a drawback of this device is that the driving shaft is operated manually to bring the overturning trays in a desired position. Therefore, this process is tiring and time consuming.

Another patent document, NL1027511C discloses a method of harvesting mushrooms from a frame structure which comprises a moving shelf (plate) and cassettes having mushroom trays present therein. The worker needs to stand on the shelf (plate) which moves up and down in the frame by using hydraulic cylinders. A drawback of this method is that the worker must harvest mushrooms on a moving shelf (plate) which is an uneasy process for a worker to perform for a long time as constantly moving shelfs may lead to feeling of uneasiness for the worker and decreases the stability of the worker.

Likewise, patent document JP2012055234 discloses a plant cultivation device comprising a base, multiple supports attached to the base and a support plate with a cultivation bed. The support plate with cultivation bed is installed in such a manner that it enables the cultivation bed to rotate with an axis for easy harvesting of the cultivated plants by the worker. However, the drawback of this prior art device is that the rotation of the cultivation bed is manually operated and does not ensure proper retention of the cultivation bed in a same position during harvesting time.

Likewise, CN206525189U discloses a frame structure having a pull-out mushroom planting basket (drawer like structure) which enables a worker to pull out the planting baskets to monitor or harvest the cultivated mushrooms. However, the drawback of this structure is that the worker must individually access each planting basket which is again tiring and a time-consuming process.

Thus, there remains a need to eliminate the above-mentioned shortcomings in the existing prior arts.

SUMMARY OF THE INVENTION

The main objective of the present invention is to overcome the limitations of the prior art by providing an apparatus for cultivating the plants and/or fungi comprising a tilt-able plant cultivation tray. Preferably said tray is hydraulically operated.

More specifically, the present invention relates to an apparatus for cultivating plants and/or fungi, preferably mushrooms, comprising at least one tilt-able plant cultivation module coupled to at least one horizontal support unit by at least one hydraulic unit. The tilt-able plant cultivation module further comprises a frame and a plant cultivation tray. The frame of the tilt-able plant cultivation module and the at least one horizontal support unit is coupled preferably by at least one hydraulic unit. This hydraulic unit enables the tilt-able plant cultivation module to tilt at a desirable angle which makes the plant harvesting process easy and convenient for the worker without affecting the under cultivated plants. In accordance with the present invention the plant cultivation module is moved towards the worker rather than the conventional harvesting whereby the worker needs to position himself towards the plant cultivation module by leaning forward and stretching himself towards the cultivation tray. The worker is also enabled to look closer to the tilt-able plant cultivation module which in turn allows him to better select mushrooms to be harvested. The module is preferably coupled to a hydraulic drive system whereby a relative incompressible liquid media such as oil is used. Other alternative drive systems are manual driven systems and pneumatic drive systems whereby an easily compressible gas such as air or a suitable pure gas is used or electrical drive systems.

In a specific embodiment, the horizontal support unit is coupled to a vertical support unit. At the same height, the vertical support unit comprises a plant cultivation module at either side of the vertical support unit. At different heights another array of plant cultivation modules can be installed depending on the overall available space for the installing of the apparatus. This specific embodiment with the configuration referred to above further allows an overall efficiency of the apparatus and its harvesting. The horizontal support units may be connected with each other via a supporting member positioned below the plant cultivation module.

In another embodiment, the plant cultivation apparatus is coupled to a horizontal transport unit for transporting selected plants from a tilt-able plant cultivation module to another place such as a cutting unit or a packaging unit.

In another embodiment, the hydraulic unit of the plant cultivation apparatus is coupled to a control unit which prevents the unnecessary movement of tilt-able plant cultivation module.

BRIEF DESCRIPTION OF THE DRAWINGS

The following drawings illustrate exemplary embodiments; however, they are helpful in illustrating objects, features and advantages of the present invention because the present invention will be more apparent from the following detailed description taken in conjunction with accompanying drawings in which.

DETAILED DESCRIPTION OF THE INVENTION

Figure 1:
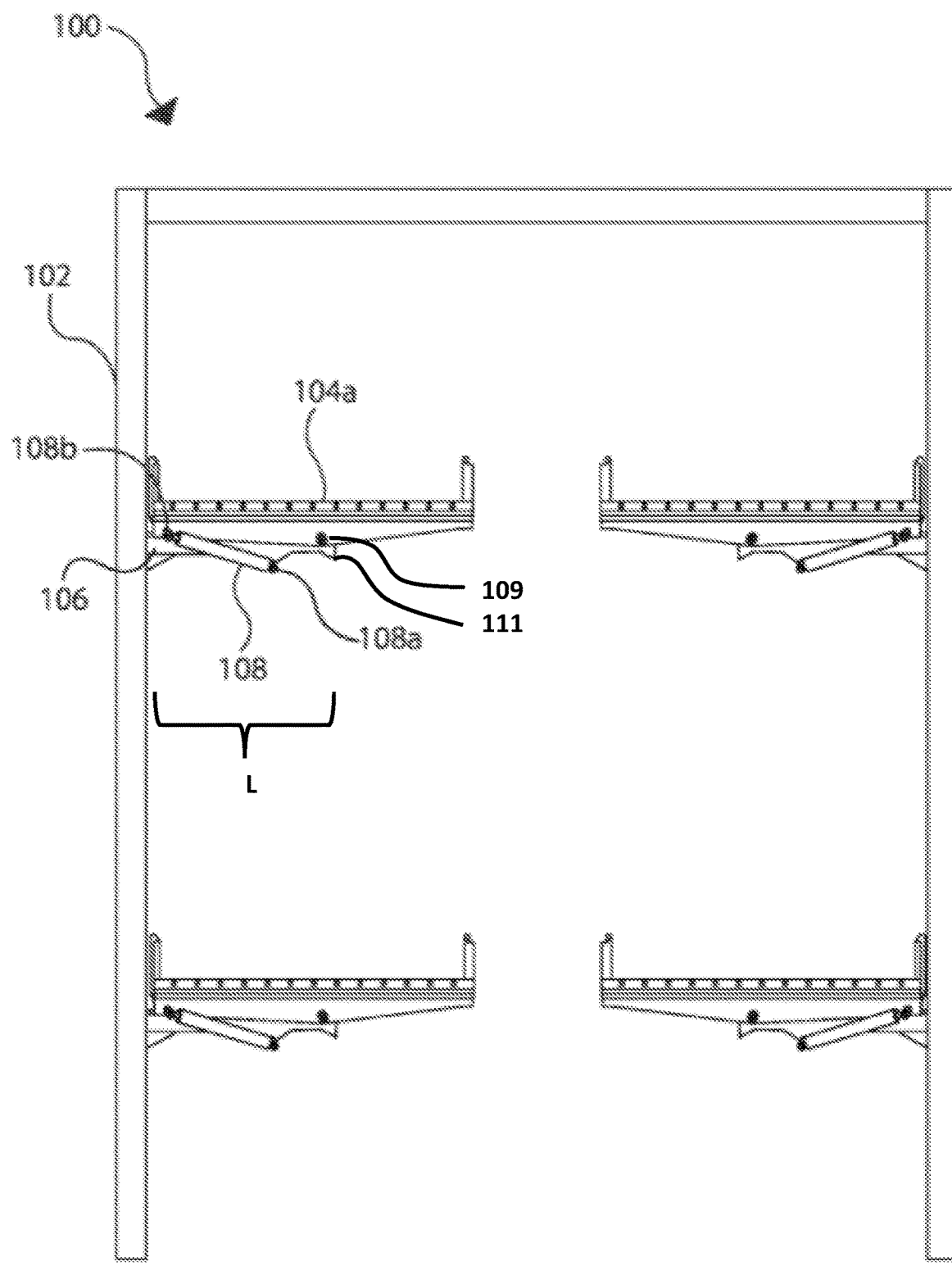
FIG. 1 illustrates the side view of the given invention according to an embodiment of the invention.

Reference will now be made in detail to the exemplary embodiment(s) of the invention, examples of which are illustrated in the accompanying drawings. Whenever possible, the same reference numerals will be used throughout the drawings to refer to the same or like parts.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

For the sake of the present invention, the word 'plant' is defined as any type of plant or fungi, including mushrooms.

The present invention relates to an apparatus for plant cultivation, preferably mushrooms, comprising at least one tilt-able plant cultivation module coupled to at least one horizontal support unit by at least one hydraulic unit, wherein a first end of the at least one hydraulic unit is coupled to the at least one horizontal support unit and a second end of the at least one hydraulic unit is coupled to the at least one tilt-able plant cultivation module. The hydraulic unit enables the tilt-able plant cultivation module to tilt at a desired angle which makes the plant harvesting process easy and convenient for a worker. Typically, the desired angle is from 30° to 85°, preferably from 45° to 85°, most preferably from 60° to 85° depending on the worker by which angle an ideal position is taken. The desired angle can further be optimized depending on the size of the mushrooms to be harvested.

The FIG. 1 illustrates a side view of a specific plant cultivation apparatus (100) according to the present invention. The plant cultivation apparatus (100) comprising a vertical support unit (102) coupled to at least one horizontal support unit (106) having a distal end (111) and a length (L). Also, the at least one horizontal support unit (106) is further coupled to a frame (104 a) by a pivot (109) and at least one hydraulic unit (108). Herein, the first end (108 a) of the at least one hydraulic unit (108) is coupled to the at least one horizontal support unit (106) and a second end (108 b) of the at least one hydraulic unit (108) is coupled to the frame (104 a). The vertical support unit (102) is configured to provide support to the horizontal support unit (106) and for example comprises support channels or a concrete wall. In a specific configuration, the vertical supports are placed from each other at a distance of 3 meter having at each side plant cultivation modules. Typically the width of the cultivation bed may range from 45 to 1.34 cm.

Figure 2:
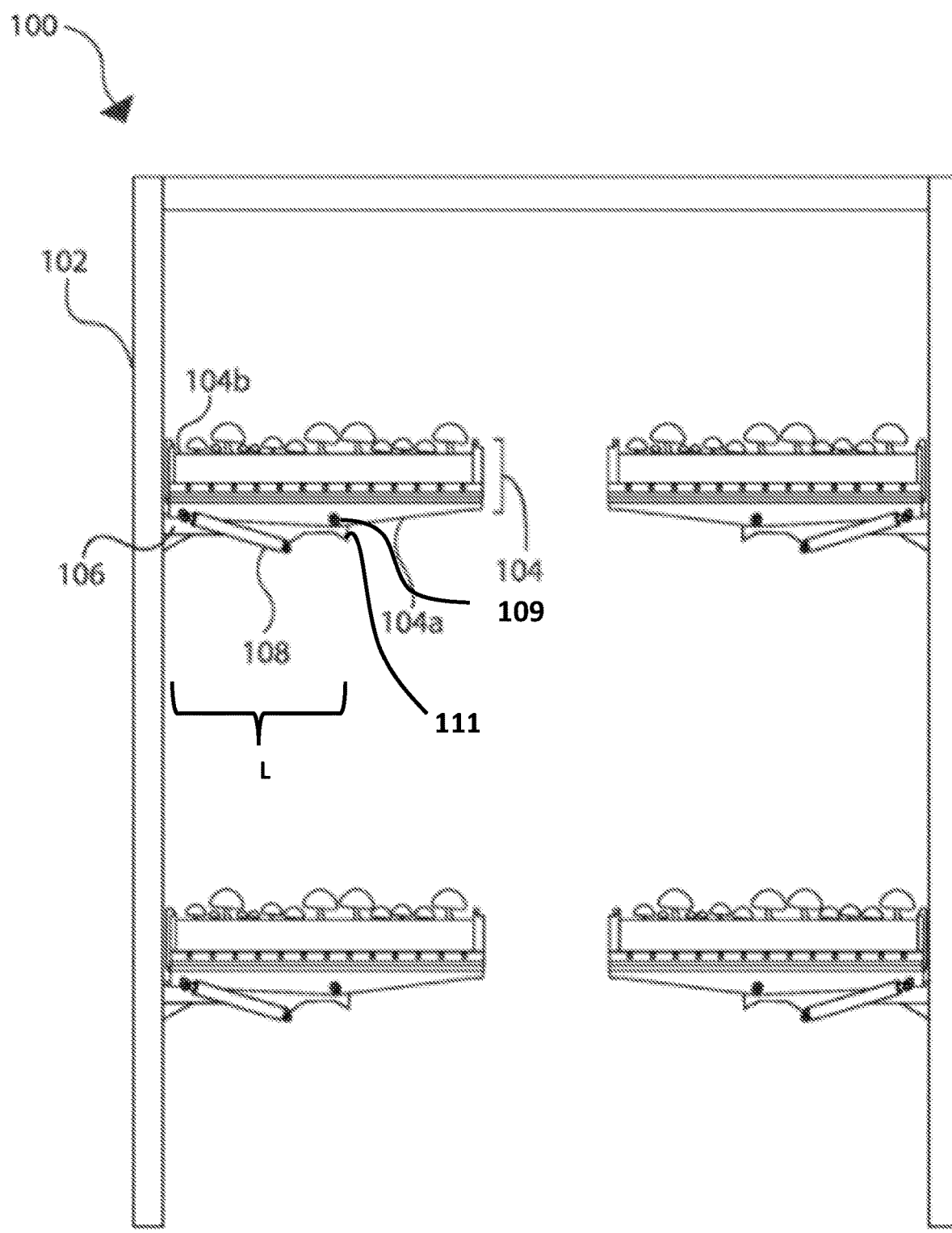
FIG. 2 illustrates the other side view of the given invention according to an embodiment of the invention.
Figure 3:
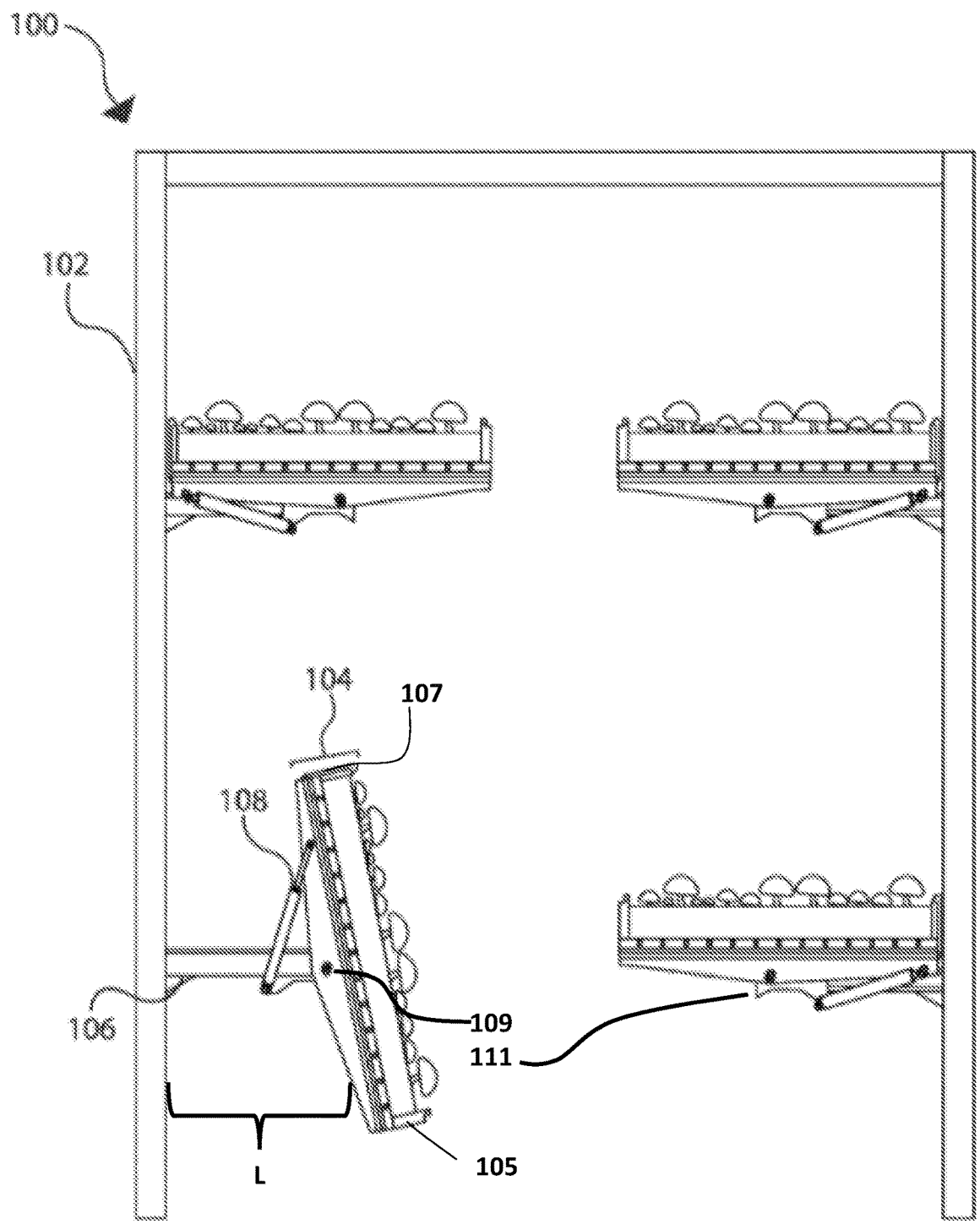
FIG. 3 illustrates another side view of the given invention according to an embodiment of the invention.

The FIG. 2 illustrates the same side view of the given the plant cultivation apparatus (1001 according to the present invention, yet in another stage of the mushroom cultivation. The plant cultivation apparatus (100) comprising a vertical support unit (102) coupled to at least one horizontal support unit (106). Further, at least one tilt-able plant cultivation module (104) is coupled to at least one horizontal support unit (106) by at least one hydraulic unit (108). Herein, at least one tilt-able plant cultivation module (104) further comprises the frame (104 a) defining a module outer edge 105 and module inner edge 107, as shown in FIG. 3, and a plant cultivation tray (104 b), to cultivate the plants, preferably mushrooms. The plant cultivation tray (104 b) is either integrally or removably coupled to the frame (104 a). Therefore, at the time of plant harvesting, the plant cultivation tray (104 b) is tilted by the hydraulic unit (108) to enable the worker (not shown) to harvest the plants or the worker is enabled to pull out the plant cultivation tray (104 b) from the frame (104 a) to harvest the plants elsewhere.

The FIG. 3 illustrates the same side view of the given the plant cultivation apparatus (100) according to the present invention, yet in another stage of the mushroom cultivation. The plant cultivation apparatus (100 comprising a vertical support unit (102) coupled to at least one horizontal support unit (106) having a distal end (111) and a length (L). Further, at least one tilt-able plant cultivation module (104) is coupled to at least one horizontal support unit (106) by a pivot (109) and at least one hydraulic unit (108). Herein, the hydraulic unit (108) in extended position enables the tilt-able plant cultivation module (104) to tilt at different angles. The tilted position of the tilt-able plant cultivation module (104) enables the worker (not shown) to monitor and/or harvest the cultivated plants.

Figure 4:
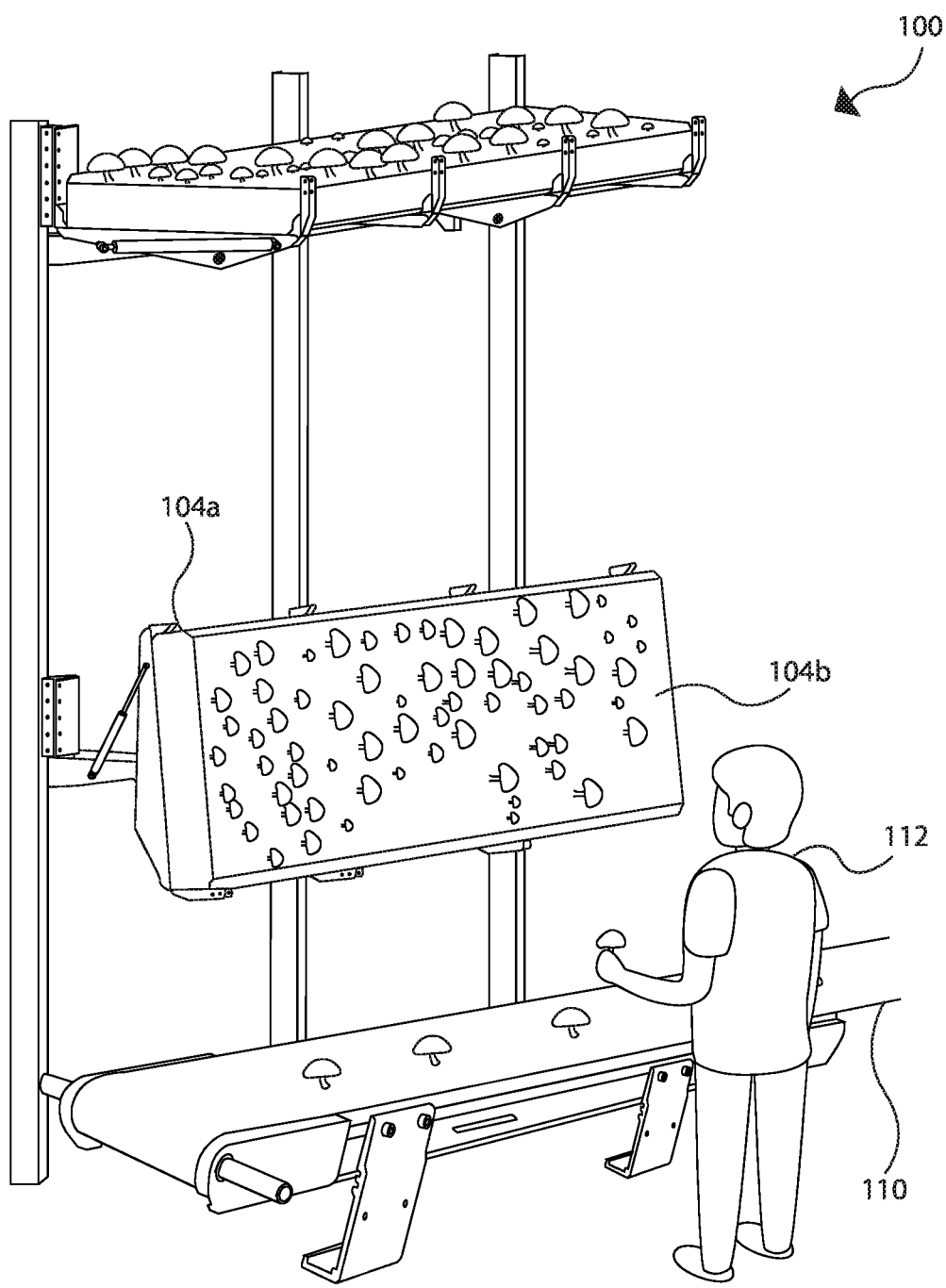
FIG. 4 illustrates a perspective view of the given invention according to an embodiment of the invention.

The FIG. 4 illustrates another side view of the plant cultivation apparatus of the present invention, wherein the plant cultivation apparatus (100) comprises a vertical support unit (102) that is coupled to at least one horizontal support unit (106). The plant cultivation apparatus (100) further comprises a horizontal transport unit (110) such as a conveyor belt which enables the worker (112) to transport the harvested plants from the plant cultivation apparatus (100) to another unit, including but not limited to, a cutting unit or a packaging unit. Herein, the horizontal transport unit (110) is a conveyor belt. The worker (112) harvests the cultivated plants directly from the plant cultivation tray (104b) and places them onto the horizontal transport unit (110) to transport them to either the packaging or cutting unit.

Figure 5:
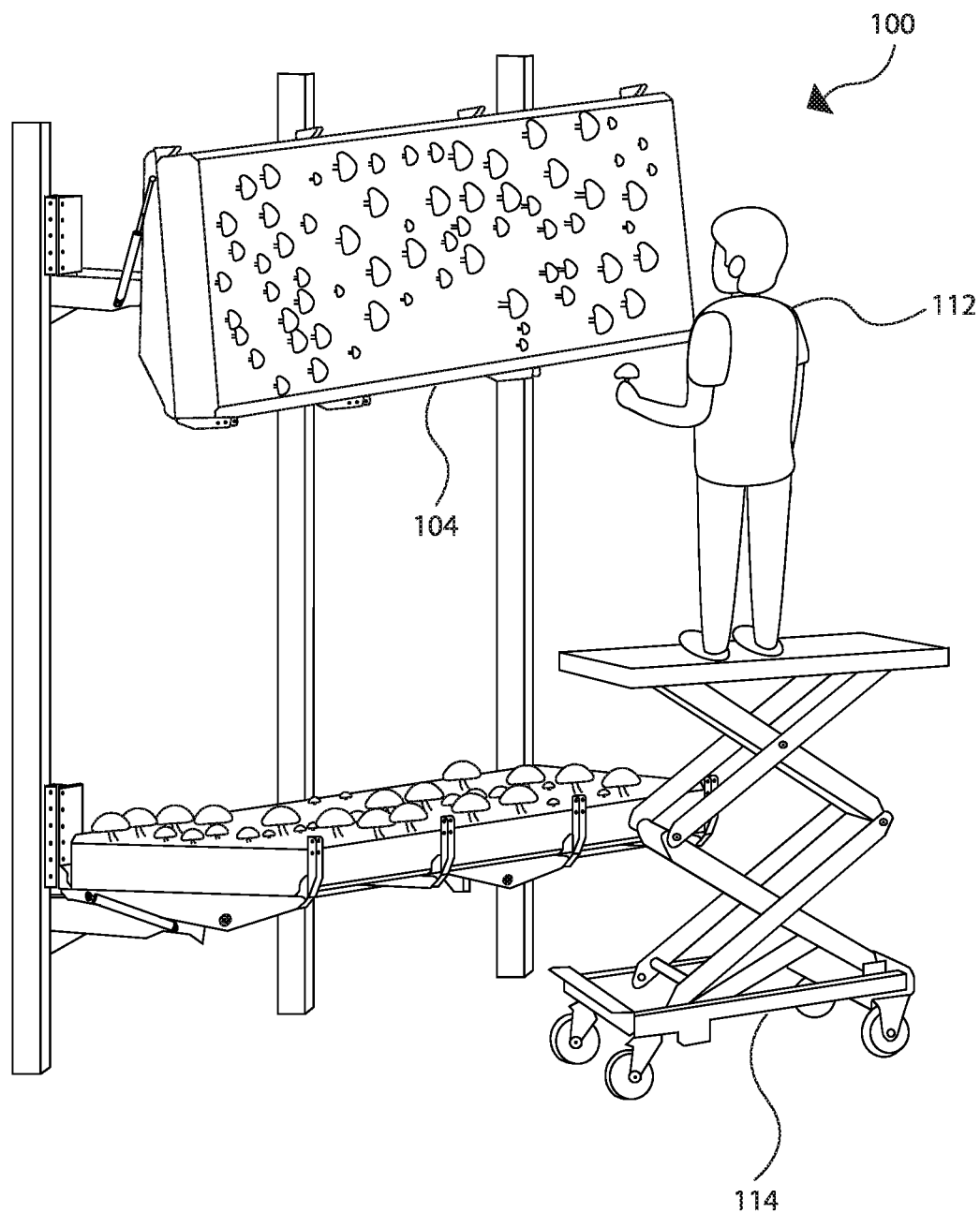
FIG. 5 illustrates another perspective view of the given invention according to an embodiment of the invention.

The FIG. 5 illustrates a perspective view of the plant cultivation apparatus (100) according to the present invention, wherein the plant cultivation apparatus (100) comprises a mobile elevator (114) which enables the worker (112) to reach to a certain height for monitoring or harvesting plants. The mobile elevator (114) is enabled to be used when at least one tilt-able plant cultivation module (104) is placed at height inaccessible for the worker (112).

In the preferred embodiment, in situations of monitoring or harvesting the plants, the worker (112) impels the tilt-able plant cultivation module (104) of the plant cultivation apparatus (100) which actuates the hydraulic unit (108). The actuated hydraulic unit (106) enables the tilt-able plant cultivation module (104) to tilt at a desired angle. Herein, the tilt-able plant cultivation module (104) is enabled to be tilted at any angle by the hydraulic unit (106), which also enable the tilt-able plant cultivation module (104) to stay at the desired position. The worker (112) hand picks the plants and transport them to either a cutting unit or a packaging unit.

In other embodiment, the worker (112) hand picks the plants and transports them to a horizontal transport unit (110). This makes the carriage of the plants convenient for the worker (112) from the plant cultivation apparatus (100) to another desired location.

In another embodiment, the hydraulic unit (108) is actuated by a control unit (not shown), wherein the control unit is electronically or hydraulically coupled to the hydraulic unit (108). Herein, either all the hydraulic units (108) of the plant cultivation apparatus (100) are coupled to one control unit for accessing all tilt-able plant cultivation modules (104) or at least one hydraulic unit (108) is coupled to an individual one control unit for accessing each tilt-able plant cultivation module (104).

Although the invention has been explained in relation to its preferred embodiment, it is to be understood that many other possible modifications and variations can be made without departing from the spirit and scope of the invention.

What is claimed is:

1. An apparatus for cultivating fungi comprising:
    a plurality of tilt-able plant cultivation modules each having a module inner edge and a module outer edge in which fungi are configured to be cultivated;
    a plurality of horizontal support units consisting of one or more cantilevered horizontal beams, the horizontal support unit coupled to a vertical support unit, each of the one or more cantilevered horizontal beams having a length between a proximal end and a distal end relative to the vertical support, each of said plurality of horizontal support units coupled to one of said plurality of tilt-able plant cultivation module by a pivot near the distal end; and
    a plurality of drive units, wherein a first end of each of said plurality of drive units is coupled to one of said plurality of horizontal support units between the proximal end and the pivot, and a second end of each of said plurality of drive units is coupled to one of said plurality of tilt-able plant cultivation modules;
    wherein each of the plurality of tilt-able plant cultivation modules can be independently tilted at an angle from 45° to 85° around the pivot by its respective drive unit only in a direction to lower the module outer edge below the horizontal support unit and to move the module inner edge away from the vertical support unit such that the fungi are tilted to a non-horizontal angle towards a worker as each of the plurality of tilt-able plant cultivation modules is tilted.

2. The apparatus according to claim 1, wherein the apparatus further comprises a control unit to enable each of said plurality of tilt-able plant cultivation modules to tilt at a desirable angle by controlling movement of its respective drive unit.

3. The apparatus according to claim 1, wherein the apparatus further comprises a horizontal transport unit for receiving harvested fungi from each of said plurality of tilt-able plant cultivation modules.

4. The apparatus according to claim 1, wherein the plant cultivation tray is integrally coupled to the frame.

5. The apparatus according to claim 1, wherein the plant cultivation tray is removably coupled to the frame.

6. The apparatus of claim 1, wherein the at least one drive unit is a manual drive system.

7. The apparatus of claim 1, wherein the at least one drive unit is an electrical drive system or a pneumatic drive system or a hydraulic drive system.

8. An apparatus for cultivating fungi, comprising:
    at least one vertical support unit;
    a horizontal support unit consisting of one or more cantilevered horizontal beams coupled to the at least one vertical support unit, each of the one or more cantilevered horizontal beams having a length between a proximal end and a distal end relative to the vertical support;
    a first tilt-able plant cultivation module having a module inner edge and a module outer edge, and in which fungi are configured to be cultivated, the first tilt-able plant cultivation module coupled, at least partially, with the horizontal support unit by a pivot near the distal end; and
    at least one drive unit, wherein a first end of the at least one drive unit is coupled to the horizontal support unit between the proximal end and the pivot, and a second end of the at least one drive unit is coupled with the first tilt-able plant cultivation module;
    wherein the first tilt-able plant cultivation module can be tilted around the pivot by the at least one drive unit only in a direction to lower the module outer edge below the horizontal support unit and to move the module inner edge away from the vertical support unit such that the fungi being cultivated are tilted to a non-horizontal angle towards a worker as the first tilt-able plant cultivation module is tilted;
    a second tilt-able plant cultivation module coupled, at least partially, with the horizontal support unit or a second horizontal support unit,
    wherein said the first tilt-able plant cultivation module can be tilted independent of the second tilt-able plant cultivation module.

9. The apparatus according to claim 8, wherein the apparatus further comprises a horizontal transport unit for receiving harvested plants from the at least one tilt-able plant cultivation module.

10. The apparatus according to claim 8, wherein the apparatus further comprises a control unit to enable each plant cultivation module to tilt at a desirable angle by controlling movement of the at least one its drive unit.

11. The apparatus according to claim 8, wherein the at least one vertical support unit is enabled to couple multiple horizontal support units at a predefined distance.

* * * * *